United States Patent [19]
Brownlie

[11] Patent Number: 5,289,459
[45] Date of Patent: Feb. 22, 1994

[54] DUPLEX DATA TRANSMISSION

[75] Inventor: John D. Brownlie, Woodbridge, England

[73] Assignee: British Telecommunications plc, London, England

[21] Appl. No.: 368,368

[22] PCT Filed: Dec. 1, 1987

[86] PCT No.: PCT/GB87/00860
§ 371 Date: May 31, 1989
§ 102(e) Date: May 31, 1989

[87] PCT Pub. No.: WO88/04498
PCT Pub. Date: Jun. 16, 1988

[30] Foreign Application Priority Data
Dec. 1, 1986 [GB] United Kingdom ................. 8628656

[51] Int. Cl.$^5$ ......................... H04B 1/38; H04B 3/20; H04L 5/14
[52] U.S. Cl. ....................................... 370/17; 370/24; 370/32; 375/58; 455/69; 455/127
[58] Field of Search ....................... 370/13, 17, 24, 32, 370/32.1, 84, 104.1; 455/63, 52.1, 67.1, 67.3, 9, 12.1, 69, 116, 127, 230; 375/8, 58, 60; 379/406, 410

[56] References Cited
U.S. PATENT DOCUMENTS

| | | |
|---|---|---|
| 3,534,264 | 10/1970 | Blasbalg et al. ................. 370/84 |
| 4,004,224 | 1/1977 | Arens et al. ..................... 455/70 |
| 4,228,538 | 10/1980 | Scharla-Nielsen et al. ......... 455/69 |
| 4,261,054 | 4/1981 | Scharla-Nielsen ................. 455/69 |
| 4,534,040 | 8/1985 | Thapar ............................ 375/59 |
| 4,580,262 | 4/1986 | Naylor et al. .................... 375/58 |
| 4,613,990 | 9/1986 | Halpern .......................... 455/69 |
| 4,648,123 | 3/1987 | Schrock .......................... 455/5 |
| 4,679,227 | 7/1987 | Hughes-Hartogs ................ 375/39 |
| 4,756,007 | 7/1988 | Qureshi et al. .................. 375/8 |
| 4,771,417 | 9/1988 | Maxwell et al. ................. 375/8 |
| 4,777,653 | 10/1988 | Bonnerot et al. ................. 455/69 |
| 4,780,883 | 10/1988 | O'Connor et al. ................ 375/58 |
| 4,811,342 | 3/1989 | Huang ........................... 370/32.1 |
| 4,811,421 | 3/1989 | Havel et al. ..................... 455/67 |
| 4,868,795 | 9/1989 | McDavid et al. ................. 455/69 |
| 4,890,316 | 12/1989 | Walsh et al. ..................... 375/8 |

FOREIGN PATENT DOCUMENTS
| | | |
|---|---|---|
| 0112108 | 6/1984 | European Pat. Off. . |
| 0154565 | 9/1985 | European Pat. Off. . |
| 60-141035 | 7/1985 | Japan . |

OTHER PUBLICATIONS
P. H. Wittke et al., "Measurements On Telephone Circuits of Parameters Pertinent to High-Speed Full-Duplex Voiceband Data Transmission", ICC '84 IEEE International Conference on Communications, 14-17 May 1984, Amsterdam, vol. 1, pp. 365-368.
"Contact RL400-a New Radio Relay Equipment", Lundblad, Ericcson Review No. 3, 1981, pp. 128-133.

Primary Examiner—Douglas W. Olms
Assistant Examiner—Alpus H. Hsu
Attorney, Agent, or Firm—Nixon & Vanderhye

[57] ABSTRACT

A duplex data transmission system in which a station can vary its transmission power to keep the signal-to-noise ratio the same in each direction or, in a system employing a different data rate in each direction, to keep the two ratios in a fixed relation to one another. In an initial training sequence, each station measures "talker echo" from its own transmission, and subsequently measures noise from the other station's transmission. The other station then makes the same measurements. The noise data thus collected is sent by both to a control circuit in one or other station which calculates from both sets of data an adjustment (e.g. a reduction) of the power to be transmitted. One or other stations then accordingly reduces power.

15 Claims, 2 Drawing Sheets

DUPLEX DATA TRANSMISSION

FIELD OF THE INVENTION

The present invention relates to duplex transmission of digital data.

BACKGROUND AND SUMMARY OF THE INVENTION

Duplex transmission of signals within the same frequency band over a link such as a telephone line can be subject to problems due to echo effects, in particular so-called "talker echo" (referred to below simply as echo) where reception by a station of echo versions of its own transmitted signals interferes with its reception function. Echo cancellers are commonly used to alleviate this problem. For the purposes of this description, echo effects will be understood to include any effect caused by a station receiving residues of its own transmission as for example residues due to impedance mismatch, inadequate filtering or, in a radio system, antenna misalignment.

According to the present invention there is provided, a duplex data transmission system comprising first and second stations connected via a transmission path, in which each station has assessment means for assessing received signal quality, at least one station has means for transmitting results of the assessment to the other station, the or each other station has control means operable to estimate a transmitted power adjustment to be made by one station, and at least one station includes means responsive thereto to effect an adjustment to its transmitting power, characterized in that the control means is operable in response to the results of its own assessment and that made by and communicated to it by the other station such that the signal-to-noise ratios of the signals received by the two stations shall be substantially in a predetermined relationship.

Other aspects of the invention are as recited in the claims.

BRIEF DESCRIPTION OF THE DRAWINGS

One embodiment of the present invention will now be described by way of example with reference to the accompanying drawings in which.

DETAILED DESCRIPTION OF THE DRAWINGS

Figure 1:
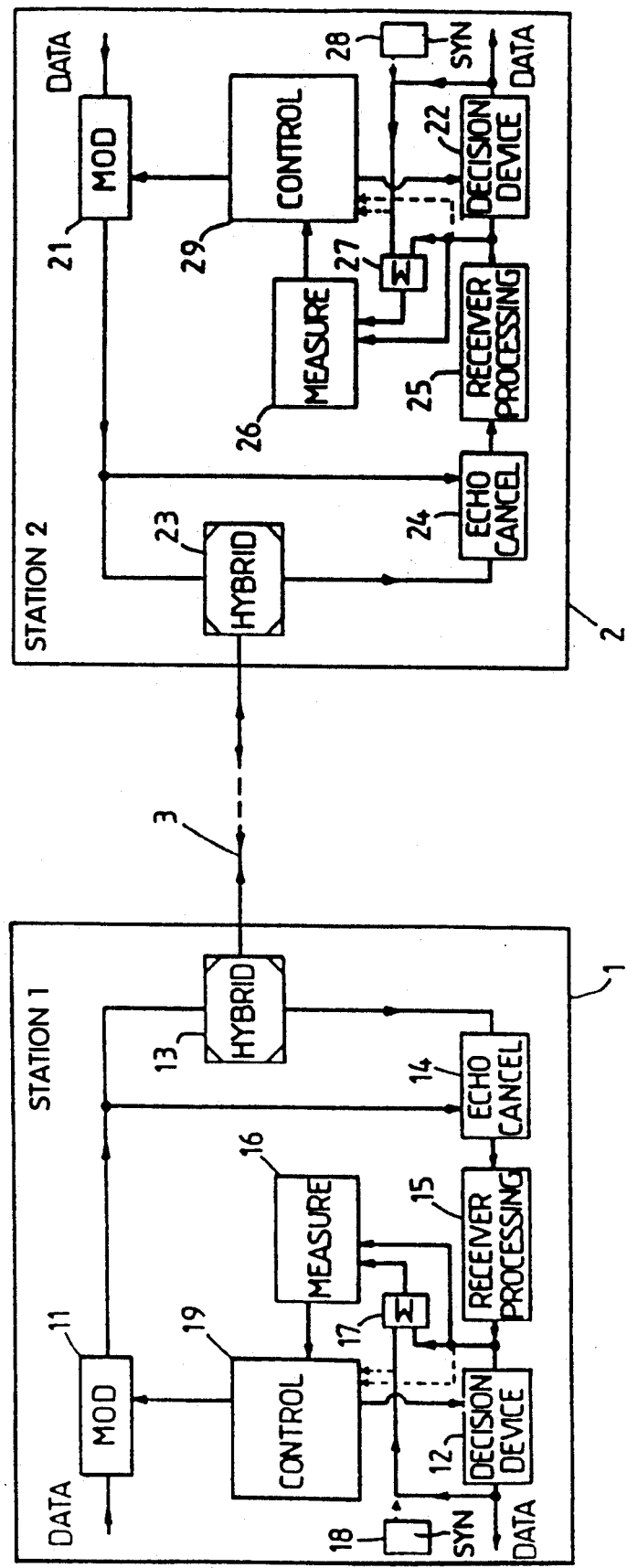
FIG. 1 is a block diagram of one embodiment of a transmission system according to the invention.

Referring to FIG. 1 two stations, 1, 2 serve for duplex transmission of digital data via a telephone line 3. The station 1 has a modem comprising a modulator 11 and demodulator decision circuit 12 and a hybrid circuit 13 for connection to the line 3. The hybrid and other components in the telephone link give rise to echo and an echo canceller 14 is also included, as well as receiver processing circuitry 15 which is assumed to include an adaptive equalizer. Similar components are provided in the other station 2.

The residual echo after cancellation may in some circumstances give rise to problems and the arrangements to be described are aimed at alleviating this problem by adjusting the transmitted power levels. If, when both stations are transmitting at full power, one station is suffering reception errors due to echo, performance may be improved by reducing the transmitted power at that station by an amount which reduces or eliminates the echo problem yet does not result in impaired reception at the other station.

Normally in a line transmission system there will be constraints on the maximum power at which a station can transmit, and it will be desirable that one station should transmit at maximum power. Accordingly, one station will transmit at maximum power, and the other will adjust by reducing its power. It will of course be understood that where a station may increase its power (as for example when a radio channel has been subject to fading) then the adjustment may be an increase in transmission power. References to reducing power in the following will be understood merely as illustrations of power adjustments.

Assessment of the appropriate reduction is made during a training sequence at the commencement of a period of communication ("a call"). Each station has a measurement device (16, 26) which, during transmission by that station (the other station remaining idle) can measure the residual talker echo, and during reception (with its transmitter idle) can measure the residual noise and other signal impairments. The measurement device 16 receives, via a subtractor 17, the difference between the output of the receiver signal processing circuitry 15, and the digital data output of the decision circuit 12. Where a known training sequence is used this could instead be synthesized locally by a synthesizer 18. Again, similar components are provided in the other station. A control unit 19 (which in practice will conveniently be located at the station as shown herein) receives the output of the measurement device 16 and controls the modem operation during the sequence.

Figure 2:
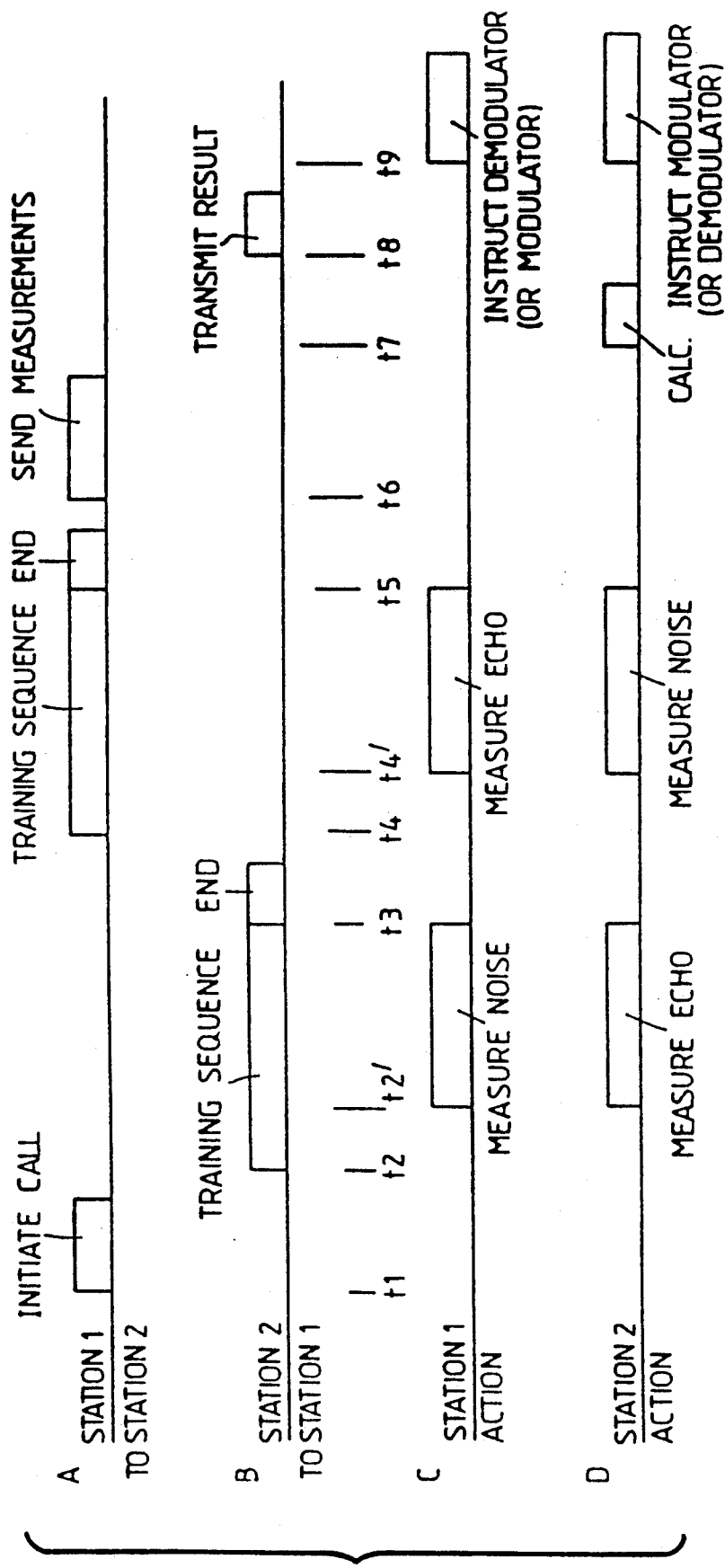
FIG. 2 is a timing chart illustrating the operation of the system of FIG. 1.

A typical sequence is illustrated in FIG. 2. Transmission by station 1 to station 2 is illustrated in line A, reverse transmission in line B. At time t1, station 1 initiates a call by transmission (at full power) to station 2. Station 2 then responds from time t2 onward by transmitting a training sequence; this is a predetermined sequence (or could be simply carrier if adaptive equalization and/or echo cancellation is not used). It is terminated by an END code at time t3. The first part of this period (t2 to t2') is allowed for operation of the echo canceller 24 and adaptive equalizer 15. From t2' to t3, the measurement device 16 in station 1 monitors the received signal to measure residual noise and other impairments after the adaptive equalization and processing, whilst the corresponding device in station 2 measures the uncancelled talker echo.

Following reception of the END code at station 1, the latter transmits a similar training sequence at time t4. The two stations again measure the received signal level and echo from t4' to t5 but of course their roles are now reversed.

In order for the measured results to be meaningful, the measured results must be related to the received signal level either by measuring the latter, or (as assumed below) providing a.g.c. so that the measurements are relative to a standard level. In the case of station 1, the gain level during the reception test must be held during the transmission test so that the echo measurement is made at the same gain. In station 2 the receiving measurement must be scaled to the receiver gain (set arbitrarily or by agc during prior reception) during transmission.

Next (time t6) station 1 (for example) transmits the echo and noise information that it has measured to station 2. The control unit 29 in station 2 is now in possession of all the measured information from the measuring devices 16, 26 and now calculates (at time t7) any required power adjustment.

The simplest case is that of symmetric duplex, where the signal to noise ratio (SNR) requirements for satisfactory transmission are the same at both ends. The control unit 29 determines for each station; relative to a standard received signal level (and taking into account any gain scaling).

the mean square value $e_1^2$, $e_2^2$ of the uncancelled talker echo upon reception by that station the mean square value $n_1^2$, $n_2^2$ of the residual received noise and other impairments upon reception at that station the sum of $e^2$ and $n^2$ gives an estimate of the receiver SNR at that station If the two values for receiver SNR are the same for both stations, no action is required. If, say, the SNR is lower at station 2, then the transmitted power at station 2 should be reduced. This will improve the SNR at station 2 (by reducing talker echo) whilst the SNR at station 1 will be reduced due to reduction of the received signal power. The optimum power reduction is often that which will give similar SNR's at both ends.

This may be determined as follows. Assuming the transmitting power at Station 1 is reduced by a factor k (k 1) then the normalized total receiver error (i.e. the reciprocal of the SNR) at station 1 is:

$$k_1 e_1^2 + n_1^2$$

That at station 2 is:

$$(e_2^2 + n_2^2)/k_1$$

since the effect of the errors is now relative to a reduced received signal level. This assumes that $n_2^2$ is mainly noise and does not reduce substantially with k. (If on the other hand $n_2^2$ were dominated by signal level dependent factors such as listener echo and other forms of distortion the appropriate expression would be $e_2^2/k + n_2^2$. A more sophisticated system might attempt to assess the relative contributions)

If these two terms are to be equal, then:

$$k_1 e_1^2 + n_1^2 = (e_2^2 + n_2^2)/k_1$$

which can readily be solved for $k_1$, taking of course the positive root. If the solution for $k_1$ is greater than unity, this implies that the power reduction should in fact be made at station 2, and a corresponding calculation must be done for station 2.

The above description assumes a fixed power limit (whether regulatory or practical) on the maximum transmitted power in each direction. In a situation where, a power reduction at one station would permit an increase at the other, this could if desired be done, and taken into account in the calculations discussed.

In other situations the power may be limited mainly by the demands of economy or security. In these cases the power may be adjusted at the two stations to the minimum required to give a desired transmission rate, the same or different in each direction. The above calculation enables the relative power transmitted from the two stations to be set. The absolute power to be transmitted from both stations can then be raised or lowered by 3 dB for each bit/symbol increase or decrease in capacity required.

Having determined which station (if any) should reduce power and the degree of reduction, the control unit 29 transmits this result to station 1 at time t8. At time t9, the control unit at the station which is to reduce power controls its modulator accordingly, whilst that at the other station informs its demodulator to make any appropriate adjustment to accommodate the resulting reduction in the received signal level. Strictly, this is not necessary if a.g.c. is permitted to restore the received signal level, but it is preferred to preserve the signal loss and adjust the demodulator decision circuit.

Once the above procedures are complete, duplex transmission can commence (at time t10). (In practice, duplex operation can commence earlier but clearly the maximum data rate cannot be used until the power adjustment has been effected).

The separate measurement of echo e and noise etc. n permits an analytical solution. Alternatively a trial and error solution may be performed by reducing the transmitted signal level at the station having the inferior receiver SNR in, for example, steps of 3 dB, until approximately equal performance is achieved in both direction. In this case, separate measurements are not necessary and a single measurement of total error at each end may be made during duplex transmission.

In the case of asymmetric duplex, the SNR requirements at the station receiving the higher data rate will normally be greater and this must be taken into account in the above described estimation process. Normally the station transmitting at the lower data rate will be the one to reduce power and the system may be simplified slightly if this assumption is made—though if the roles of the high and low data rate stations are liable to be reversed, then two calculations for power reduction at either station when transmitting at the low rate, will need to be made.

Another approach that may be adopted is where one specifies for the asymmetrical system that a fixed data rate used be for the lower rate direction (e.g. 2400 bit/s) and that the higher rate be selected according to the available transmission performance—for example 9600 bit/s may be specified but the system permitted to drop back to 7200 or even 4800 bit/s if the available SNR is not sufficient to sustain reasonable quality at 9600 bit/s.

In that case, the adjustment decision can be based solely on the measurements made at the lower rate received; the transmitting power of the lower rate transmitter is reduced (if appropriate) to a level just sufficient to maintain a predetermined SNR at the lower rate receiver. The measurements made at the higher rate receiver can then be used to determine which data rate is to be employed for the higher rate direction.

In general, the properties of a transmission link between two stations can be expected to vary from time to time—e.g. due to switching of transmission path sections, or because one station communicates with various other stations with different path lengths and/or station equalizer echo cancelling characteristics. It has been envisaged above that a power reduction will be assessed at the commencement of a call and remain fixed for the duration of the call; however facilities for readjustment during a call may be provided if desired. Conversely, the properties of a permanent "private wire" link between two stations may not vary at all and in this case a single adjustment—e.g. using ancillary equipment temporarily connected to the stations—at the time of installation may suffice.

A further possibility is simply to use a fixed power reduction in the lower rate transmitting direction as a compromise setting for a limited range of transmission links, and omit any measurement procedure.

One example of a situation in which the above described system may be used is in facsimile transmission equipment.

Whilst any suitable form of modulation and communication protocols may be employed, one example is the CCITT recommendation V32. The training sequences provided by the recommendation for equalizer/echo canceller adaptation may, if time permits, be used for the measurements described. If not, those sequences may be lengthened, or the following "rate signals" employed for the measurement function. One example of a modified version of the V32 modulation standard, suitable for the lower bit-rate side of an asymmetric system, which also permits selection of alternative point constellations in the Quadrature Amplitude Modulation (QAM) diagram for the purpose of transmitted power reduction, is described in copending U.S. application Ser. No. 07/368,357 filed May 31, 1989 and having the same priority date as the present application.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A duplex data transmission system comprising first and second transceiver stations connected via a transmission path, in which each transceiver station has assessment means for assessing received signal quality, said first transceiver station has means for transmitting the results of its assessment to said second transceiver station, said second transceiver station has estimating means operable in response to the results of the assessment made at said second transceiver station and of that made at, and communicated to it by, said first transceiver station to estimate a transmitting power adjustment to be made, and at least one of said first and second transceiver stations includes adjustment means responsive to the results of said estimate for adjusting its transmitting power to substantially maintain signal-to-noise ratios of the signals received by said two transceiver stations in a predetermined relationship and to substantially minimize echo effects on said transmission path between said first and second transceiver stations.

2. A transmission system according to claim 1, in which the transmission path comprises a wire link.

3. A transmission system according to claim 1 in which one transceiver station transmits at a maximum power and the other transceiver station having the adjustment means reduces the transmitting power of said other transceiver station.

4. A transmission system according to claim 1, in which data rates of the two transmission directions are the same and the predetermined relationship is equality.

5. A transmission system according to claim 1 in which the assessment means of one of said transceiver stations comprises means for measuring echo during a training sequence of transmission by said one transceiver station and measuring received signal impairments during a training sequence of transmission by the other station.

6. A transmission system according to claim 5 in which the estimating means is arranged to calculate the transmitting power adjustment.

7. A transmission system according to claim 1 in which the assessment means of one of said transceiver stations is arranged to measure the total of echo and received signal impairments during duplex transmission.

8. A transmission system according to claim 7 in which the estimating means is arranged to determine the transmitting power adjustment by an iterative process of power adjustment and power re-measurement.

9. A transmission system according to claim 1 wherein said estimating means in said second station, in dependence on the results of the estimate, selectively adjusts the transmitting power at said second station and transmits to said first station a power adjustment signal, said adjustment means at said first station responsive to said adjustment signal to adjust transmitting power at said first station.

10. A first duplex data transmission station including transceiving means for use in a transmission system, comprising:
assessment means for assessing a quality of a signal received from a second transmission station in the system,
means for receiving the results of a received signal quality assessment by the second station,
estimating means operable in response to the results of both assessments for estimating a transmitting power adjustment, and
means for adjusting transmitting power of one of the first and second stations in response to the estimated power adjustment to establish substantially a predetermined relationship between a signal-to-noise ratio of the signals received by the first and second stations and to substantially minimize echo effects in signals transmitted between the first and second stations.

11. A transmission station according to claim 10, in which the estimating means is operable to estimate a power adjustment which maintains the signal-to-noise ratios substantially equal.

12. A transmission station according to claim 10 or 11 wherein the estimating means, depending on the result of the estimate, adjusts the station's transmitting power and transmits to the other station a signal indicating a power adjustment to be made by the other station.

13. A method of duplex data transmission between first and second stations, comprising:
assessing received signal quality at each station;
transmitting the results of the assessments to estimating means in any of the first and second stations and estimating a power adjustment to be made based on the results of assessments made by both stations; and
adjusting transmitting power of at least one of the first and second stations to bring signal-to-noise ratios received by the two stations substantially into a predetermined relationship and to substantially minimize echo effects in duplex transmissions between the first and second stations.

14. A method according to claim 13, further comprising:
providing the estimating means at only one of the first and second stations.

15. A duplex data transmission system comprising first and second stations connected via a transmission path, wherein each of said stations has assessment means for assessing received signal quality and means for transmitting the results of the assessment to the other of said stations, and wherein data rates of the two transmission directions are different, the station to transmit at the lower rate is responsive to the results of the assessment by the other station to adjust its transmitting power, and the station to transmit at the higher rate is responsive to the results of assessment by the lower rate station to select its transmitting data rate.

* * * * *